(12) United States Patent
Golic

(10) Patent No.: US 8,219,602 B2
(45) Date of Patent: Jul. 10, 2012

(54) METHOD AND APPARATUS FOR GENERATING RANDOM DATA

(75) Inventor: Jovan Golic, Turin (IT)

(73) Assignee: Telecom Italia S.p.A., Milan (IT)

( * ) Notice: Subject to any disclaimer, the term of this patent is extended or adjusted under 35 U.S.C. 154(b) by 1089 days.

(21) Appl. No.: 11/659,541

(22) PCT Filed: Aug. 9, 2004

(86) PCT No.: PCT/EP2004/051747
§ 371 (c)(1),
(2), (4) Date: Feb. 6, 2007

(87) PCT Pub. No.: WO2006/015625
PCT Pub. Date: Feb. 16, 2006

(65) Prior Publication Data
US 2007/0244950 A1     Oct. 18, 2007

(51) Int. Cl.
*G06F 1/02*     (2006.01)
(52) U.S. Cl. ........................... 708/250; 708/313
(58) Field of Classification Search .................. None
See application file for complete search history.

(56) References Cited

U.S. PATENT DOCUMENTS

| | | |
|---|---|---|
| 3,790,768 A | 2/1974 | Chevalier et al. |
| 3,875,528 A | 4/1975 | Hirsch |
| 4,202,051 A * | 5/1980 | Davida et al. ............ 380/46 |
| 4,641,102 A | 2/1987 | Coulthart et al. |
| 4,799,259 A | 1/1989 | Ogrodski |
| 4,855,690 A | 8/1989 | Dias |
| 4,905,176 A | 2/1990 | Schulz |
| 5,570,307 A | 10/1996 | Takahashi |
| 6,240,432 B1 | 5/2001 | Chuang et al. |
| 6,581,078 B1 | 6/2003 | Liardet |
| 6,631,390 B1 | 10/2003 | Epstein |
| 7,206,797 B2 * | 4/2007 | Gressel et al. ............ 708/250 |
| 2002/0156819 A1 | 10/2002 | Oerlemans |
| 2002/0186086 A1 | 12/2002 | Curiger et al. |
| 2003/0014452 A1 | 1/2003 | Le Quere |
| 2003/0059045 A1 | 3/2003 | Ruehle |
| 2004/0205095 A1 | 10/2004 | Gressel et al. |

(Continued)

FOREIGN PATENT DOCUMENTS

EP     0 782 069 A1     7/1997

OTHER PUBLICATIONS

K. Zeng et al., "Pseudorandom Bit Generators in Stream-Cipher Cryptography," Computer, vol. 24, No. 2, pp. 8-17 (Feb. 1, 1991).

(Continued)

*Primary Examiner* — Lewis A Bullock
*Assistant Examiner* — Michael D Yaary
(74) *Attorney, Agent, or Firm* — Finnegan, Henderson, Farabow, Garrett & Dunner, L.L.P.

(57) ABSTRACT

An apparatus for generating random data includes a raw random sequence source adapted to generate a raw random sequence and a digital post processor adapted to process the raw random sequence to generate the random data, wherein the digital post-processor includes a synchronous finite state machine having at least one input adapted to repeatedly receive a current value of the raw random sequence and at least one output to provide a current output value depending on previous values of the raw random sequence.

19 Claims, 5 Drawing Sheets

U.S. PATENT DOCUMENTS

2007/0273408 A1    11/2007    Golic

OTHER PUBLICATIONS

B. Barak et al., "True Random Number Generators Secure in a Changing Environment," Cryptographic Hardware and Embedded Systems—CHES 2003, Lecture Notes in Computer Science, vol. 2779, pp. 166-180 (2003).

T. E. Tkacik, "A Hardware Random Number Generator", Cryptographic Hardware and Embedded System—CHES 2002, Lecture Notes in Computer Science, vol. 2523, pp. 450-453, (2003).

M. Dichtl, "How to Predict the Output of a Hardware Random Number Generator", Cryptographic Hardware and Embedded System—CHES 2003. Lecture Notes in Computer Science, vol. 2779, pp. 181-188, (2003).

Wang et al.; Complete Feedback Shift Register Design for Built-In Self-Test, International Conference on Computer Aided Design, (ICCAD), XP-000747185, Santa Clara, Washington, IEEE Comp. Soc. Press, US, pp. 56-59, (1986).

Wang et al.; Institute of Electrical and Electronics Engineers, "A Hybrid Design of Maximum-Length Sequence Generators", Proceeding of the Annual Expert Systems in Government Conference, Washington, IEEE Comp. Soc. Press, US, Conf. 3, pp. 38-47, (1986).

"Debruijn Sequences From Cellular Automata" IBM Technical Disclosure Bulletin, IBM Corp. New York, US, vol. 33, No. 10A, pp. 410-413, (1991).

* cited by examiner

METHOD AND APPARATUS FOR GENERATING RANDOM DATA

CROSS REFERENCE TO RELATED APPLICATION

This application is a national phase application based on PCT/EP2004/051747, filed Aug. 9, 2004, the content of which is incorporated herein by reference.

BACKGROUND OF THE INVENTION

1. Field of the Invention

The present invention generally relates to a method and an apparatus for generating random data, in particular to a method and an apparatus for post-processing raw random binary sequences to obtain purely random and/or pseudo-random numbers.

2. Background of the Invention

In many applications in the field of computers and other electronic devices there is a need for a physical source of true random numbers. Such applications include computer simulations of various probabilistic algorithms and processes, such as Monte Carlo numerical analysis, computer games, cryptographic algorithms and protocols whose security relies on the ability to generate unpredictable secret keys. High-speed truly random sequences are also needed for setting up countermeasures against so-called side-channel attacks against specific electronic devices, particularly microelectronic devices, implementing security schemes, such as integrated chip cards; such countermeasures include for example random masking of cryptographic functions, as well as generation of secret keys for the encryption of internal links and memories in such devices.

The output of a Random Number Generator (RNG) is typically a binary sequence that, in principle, has to be unpredictable in the sense of the information theory. Equivalently stated, it should be possible to statistically model the RNG output as a purely random sequence, i.e., a sequence of mutually independent, uniformly distributed binary random variables (bits), with maximal possible entropy per bit. In particular, it should be computationally infeasible to distinguish the RNG output sequence from a purely random sequence or, equivalently, it should be computationally infeasible to predict the RNG output sequence.

Several techniques are known in the art for generating true random numbers. For practical reasons, RNGs implemented in the solid-state, semiconductor technology are preferable, because they can more easily be incorporated in Integrated Circuits (ICs), particularly digital ICs. A conventional type of hardware-based RNGs exploit thermal noise in resistors and/or shot noise in PN-junctions; regretfully, these RNGs include analog elements, and are therefore difficult to be incorporated in digital ICs. RNGs that can be implemented by digital integrated circuits only are therefore preferred; such RNGs are usually based on the phase jitter of free-running oscillators, implemented as ring oscillators (a structure consisting of an odd number of inverter logic gates connected in a circular cascade to form a ring). Another class of digital RNGs exploit the meta-stability of SR (Set-Reset) latches and edge-triggered flip-flops based on SR latches such as D-type flip-flops.

Typically, an RNG can be represented as essentially consisting of two parts, namely, a physical source of randomness, which produces a raw random binary sequence which is random, but not purely random, and a post-processing part, which produces the final output sequence by processing elements of the raw random binary sequence. This is disclosed for example in US 2003/0014452, and such an architecture is for example also recognizable in the circuits described in U.S. Pat. No. 4,641,102, U.S. Pat. No. 5,570,307, U.S. Pat. No. 6,240,432, US 2002/0156819, and US 2002/0186086.

The raw binary sequence may have a high speed, but it typically has statistical weaknesses: individual bits in the sequence show a slight bias, i.e., the probabilities of, occurrence of the two binary output values, "0" and "1" are not equal, and/or bits in the sequence that are relatively close to each other in time are correlated to a certain degree.

The main objective of the post-processing part is to eliminate such statistical weaknesses from the raw random binary sequence, in the information-theoretic or at least in the computational sense. Eliminating statistical weaknesses in the information-theoretic sense means that each output bit should approximately convey one bit of information or entropy, a result possible to be achieved only by reducing the speed of the raw random binary sequence. Such post-processing is sometimes referred to as randomness extraction. Eliminating statistical weaknesses in the computational sense means that the output sequence need not be purely random, but it should be computationally infeasible or at least difficult to distinguish the output sequence from a purely random sequence. In this case, the speed need not be reduced.

Another important objective of post-processing is to provide robustness of the statistical properties of the RNG output sequence with respect to changes in operating conditions, such as voltage, temperature, and other environmental conditions, and also with respect to physical attacks against the physical source of randomness, particularly in case the raw random binary sequence is heavily biased.

Most of the techniques proposed so far for post-processing of raw random binary sequences are essentially linear in one way or the other. More precisely, the known techniques are typically based on sequential linear transformations implemented by synchronously clocked Linear Feedback Shift Registers (LFSRs) with additive inputs (which means that some of the LSFR internal signals are combined in XOR—eXclusive OR—with the raw binary sequence as an input signal), or on block linear transformations applied to the input raw random binary sequence to be post-processed. The Applicant observes that if the speeds of the LFSR clock signal and the input signal are the same, then this method is essentially known in digital communications as data scrambling and serves to improve the statistics of the input signal. A basic block transformation blown in the art is the so-called Von Neyman extractor, which is capable of removing the bias from a raw random binary sequence, provided that the bits in the input raw random binary sequence are statistically independent. More precisely, the input bits are divided into non-overlapping pairs, and for each pair, the output bit is produced only if the two input bits in the pair are not equal and is equal to the first (or the second) input bit. Equivalently, the XOR operation is applied to individual input bit pairs: if the result is equal to zero, then the pair is discarded, and if it is equal to one, then the first (or the second) input bit is taken to the output. Consequently, even if the raw random binary sequence is purely random, the speed is reduced four times on average.

Randomness extraction techniques can be based on linear transformations only. However, these techniques may become insecure if the speed reduction is not sufficiently large.

The usage of general block linear transformations is suggested and analyzed in B. Barak et al., "True Random Number Generators Secure in a Changing Environment," Cryptographic Hardware and Embedded Systems—GIES 2003, Lecture Notes in Computer Science, vol. 2779, pp. 166-180, 2003, which proposes a technique for digital post-processing of random data called randomness extraction that is based on a randomly chosen and fixed linear function, applied to blocks of input data, taken from any random number generator, to produce reduced-size blocks of output data. By using some known results on the so-called universal hash functions, it is proven that under certain conditions almost all such functions give rise to nearly uniform distributions of the corresponding blocks of output data. However, the Applicant argues that these mathematical results are not very meaningful for a fixed linear function, as there may exist families of linear functions that do not yield nearly uniform distributions of output blocks. Further, a nearly uniform distribution of output blocks does not imply a nearly uniform distribution of each (linear) transformation of output blocks. In addition, this sort of randomness extraction is not sufficiently robust, namely, it does not provide computational unpredictability of output data if the entropy of input data is significantly reduced by the adversary's action on the underlying random number generator. As the blocks have to be long, the implementation cost in terms of the gate count is considerable.

Most physical randomness sources are capable of generating raw random binary sequences that possibly have a high speed, but whose entropy rate (entropy content per bit) is not high. A general, well-known technique for producing a high-speed, but pseudo-random sequence calls for applying a randomness extractor to the raw random binary sequence, thereby reducing its speed, and then to use the obtained sequence to produce a random seed for a PRNG; an example of this general technique is provided in the already cited reference US 2003/0014452. The PRNG is clocked at a high speed to produce the final output sequence. The resulting output sequence is thus a pseudo-random sequence, generated from a truly random seed. Such a PRNG should be computationally secure (i.e., its output sequence should be computationally unpredictable), and this makes the PRNG relatively complex to be implemented. For example, it can be based on cryptographic hash functions.

In U.S. Pat. No. 6,581,078, a physical noise source produces digital signals that are combined with signals produced by a PRNG, through an additional memory and using an XOR gate. The combined signals are sent to the input of the PRNG. The resulting signals are allegedly unpredictable while exhibiting the intended statistical characteristics.

The Applicant observes that the speed of the PRNG is not specified, and that the requirements for the PRNG, except for the output statistics, are not specified in that document, and a linear, and hence insecure, PRNG based on a linear congruence is suggested to be used.

SUMMARY OF THE INVENTION

The Applicant is of the opinion that, in spite of the known solutions, a need remains for a new method and device for digital post-processing of random data that can be efficiently implemented by using only logic gates in digital semiconductor technology.

In particular, the Applicant has observed that in order to achieve computational security, the post-processing technique should not merely be a linear one, but should also incorporate non-linear transformations.

The Applicant has found that instead of using a randomness extractor to obtain a truly random sequence from a raw random binary sequence, and then a PRNG producing a pseudo-random sequence from a random seed periodically provided thereto by the randomness extractor, it is possible to avoid such a randomness extraction by directly applying the raw random binary sequence to a PRNG.

In particular, the Applicant has found that an efficient post-processing of a raw random binary sequence generated by a (physical) source of randomness can be carried out by operating a PRNG in a non-autonomous mode, i.e., by continuously feeding the PRNG with the raw random binary sequence, in such a way that the output binary sequence is a purely random binary sequence if the input binary sequence is a purely random binary sequence. This condition ensures that the PRNG itself cannot introduce statistical weaknesses in the raw random binary sequence. For example, the feeding can be implemented via one or more additive inputs to PRNG through which the raw random binary sequence is supplied by means of XOR logic gate(s).

For the purposes of the present invention, by "non-autonomous" it is intended that at least one of the inputs to the device is received from a different device.

The PRNG may be a synchronous sequential circuit implementing a Finite-State Machine (FSM).

The proposed PRNG is structurally simple and fast, in order to be relatively easily implemented in hardware, and at the same time practically secure, in the sense that its output sequence is not easily predictable even if the raw random binary sequence is assumed to be known. In particular, this should be true if the PRNG is assumed to be operated in the autonomous mode, without the continuous feeding of the raw random binary sequence, which can typically be implemented by assuming that the raw random binary sequence consists of all zeros.

According to a first aspect of the present invention, an apparatus for generating random data is provided and comprises a raw random sequence source adapted to generate a raw random sequence and a digital post-processor adapted to process said raw random sequence to generate said random data, wherein said digital post-processor comprises a synchronous finite-state machine having at least one input adapted to repeatedly receive a current value of said raw random sequence and at least one output to provide a current output value depending on previous values of said raw random sequence.

In an embodiment of the present invention, said digital post-processor further comprises a logic circuit suitable to receive said current output value and said current value of said raw random sequence and to provide a current output data as a function of said current output value and said current value of said raw random sequence, the random data being related to the sequence of said current output data.

Preferably, the apparatus further comprises a decimation circuit suitable to receive said output data and to generate said random data, said finite state machine being suitable to be clocked by a first clock signal, said decimation circuit operating according to a second clock signal that has a period that is k times the period of the first clock signal, k having a value variable in time, said value being calculated each time a random data is generated. In particular, said value of k at a given time depends on the current state of the finite-state machine.

Said logic circuit may comprise a latin-square type logic circuit, said latin-square type logic circuit may comprise an XOR gate.

In particular, said finite-state machine implements a state-transition function and comprises a state-transition sequential circuit having a set of inputs and a set of outputs, said set of outputs being suitable to provide current state values of said state-transition function, said set of inputs including said at least one input of said finite-state machine, said apparatus comprising a further logic circuit suitable to receive at least one of said current state values and said current value of said raw random sequence and to provide an input value for said state-transition sequential circuit.

Preferably, the finite-state machine is such that the output binary sequence is purely random if the input raw random sequence is purely random.

In a preferred embodiment of the present invention, the finite-state machine is such that the output binary sequence is computationally unpredictable even if the raw random sequence is known.

Even more preferably, the finite-state machine is such that a change in the first input bit of the input binary sequence induces a computationally unpredictable change in the subsequent output binary sequence.

In particular, said finite-state machine includes a plurality of synchronous delay logic units connected in a cascade one to another and clocked by the first clock signal, the plurality of synchronous delay logic units comprising a first and a last synchronous delay logic units in the cascade, said set of outputs comprising an output of the last synchronous delay logic unit and said set of inputs comprising an input of the first synchronous delay logic unit, said finite-state machine comprising a first feedback path from the output of the last synchronous delay logic unit to the input of the first synchronous delay logic unit, said plurality of synchronous delay logic units further comprising at least one intermediate synchronous delay logic unit in the cascade.

In an embodiment of the present invention, said finite-state machine comprises at least one second feedback path from said output of the last synchronous delay logic unit to an input of a respective synchronous delay logic unit in the cascade, said respective synchronous delay logic unit being chosen in the group consisting of the at least one intermediate synchronous delay logic unit and the last synchronous delay logic unit in the cascade.

In particular, the finite-state machine further comprises an XOR logic combination of said at least one second feedback path and the output of a preceding synchronous delay logic unit that precedes said respective synchronous delay logic unit where said at least one second feedback path terminates.

In an embodiment of the present invention, said at lest one second feedback path includes a plurality of feedback paths.

The finite-state machine has an output signal, said output signal is preferably extracted from a first internal state signal of the finite-state machine according to an irregular clocking. In particular, the irregular clocking is controlled by a clocking control signal, said clocking control signal being a logic combination of at least a second and a third internal state signals of the finite-state machine.

In an embodiment of the present invention, the output signal is a logic combination of the first internal state signal with at least a fourth and a fifth internal state values of the finite-state machine.

In an embodiment of the present invention, said raw random sequence source may comprise at least one further logic circuit corresponding to an associated finite-state machine having a state-transition function including states arranged to form cycles of states,
wherein:
the at least one further logic circuit has a set of logic circuit inputs and a set of logic circuit outputs fed back to said logic circuit inputs;
the associated finite-state machine is autonomous and asynchronous;
the state-transition function is void of loops; and
any of said cycles of states has either a minimum length equal to three states, in case the cycle is stable, or a minimum length of two states, in case the cycle is meta-stable.

In particular, said finite-state machine associated with the at least one further logic circuit has an output function, and the random binary sequence generator further comprises at least one further output logic circuit operatively connected to at least one of said logic circuit outputs of the at least one further logic circuit, the further output logic circuit having an output for providing an output signal by implementing said output function. The at least one of said logic circuit outputs has a value that cannot get stuck at a constant value.

The raw random sequence source may further comprise a sampling circuit for sampling said output signal.

In particular, the at least one further logic circuit comprises a plurality of asynchronous logic inversion units connected in cascade one to another, respectively.

Said plurality of asynchronous logic inversion units may comprise a first and a last asynchronous logic inversion units in the cascade, said set of logic circuit outputs comprising an output of the last asynchronous logic inversion unit and said set of logic circuit inputs comprising an input of the first asynchronous logic inversion unit, said at least one further logic circuit comprising a first feedback path from the output of the last asynchronous logic inversion unit to the input of the first asynchronous logic inversion unit.

Said plurality of asynchronous logic inversion units may further comprise at least one intermediate asynchronous logic inversion unit in the cascade, wherein said at least one logic circuit comprises at least one second feedback path from an output of a respective asynchronous logic inversion unit in the cascade to the input of the first asynchronous logic inversion unit, and wherein said respective asynchronous logic inversion unit is chosen in the group consisting of the first asynchronous logic inversion unit and the at least one intermediate asynchronous logic inversion unit.

In an embodiment of the present invention, the at least one further logic circuit further comprises an XOR logic combination of the first and the at least one second feedback paths.

In particular, said at least one second feedback path in the further logic circuit includes a plurality of second feedback paths.

The at least one further logic circuit may have an associated binary polynomial f(x) defined as:

$$f(x) = \sum_{i=0}^{r} f_i x^i$$

wherein $x^i$ corresponds to the output of the $i^{th}$ asynchronous logic inversion unit in the cascade, $f_i$ is a feedback coefficient associated with the asynchronous logic inversion unit and indicative of the presence of the $i^{th}$ of said plurality of second feedback paths from said output of the $i^{th}$ inversion unit to the input of the first inversion unit, the summation being a binary addition, and the binary polynomial f(x) satisfying the conditions:

$f(x) = (1+x)h(x)$ and $h(1) = 1$

In another embodiment of the present invention, said plurality of asynchronous logic inversion units comprises at least one intermediate asynchronous logic inversion unit in the cascade, and said at least one further logic circuit comprises at least one second feedback path from said output of the last asynchronous logic inversion unit to an input of a respective asynchronous logic inversion unit, said respective asynchronous logic inversion unit being chosen in the group consisting of the at least one intermediate asynchronous logic inversion unit and the last asynchronous logic inversion unit in the cascade.

In particular, the at least one further logic circuit may further comprise an XOR logic combination of said at least one second feedback path and the output of a preceding asynchronous logic inversion unit that precedes said respective asynchronous logic inversion unit where said at least one second feedback path terminates.

Said at lest one second feedback path in the further logic circuit may include a plurality of feedback paths, and the logic circuit with feedback may have an associated binary polynomial g(x) defined as:

$$g(x) = \sum_{i=0}^{s} g_i x^i$$

wherein $x^i$ corresponds to the output of the $i^{th}$ asynchronous logic inversion unit in the cascade, $g_i$ is a feedback coefficient associated with the $i^{th}$ asynchronous logic inversion unit and indicative of the presence of the $i^{th}$ of said plurality of second feedback paths from said output of the last inversion unit to the input of the $i^{th}$ inversion unit, the summation being a binary addition, and the binary polynomial g(x) satisfying the conditions:

$$g(x) = (1+x)k(x)$$

with s being odd.

In an embodiment of the present invention, the binary polynomial g(x) satisfies the further condition:

$$k(1) = 1.$$

Each of said asynchronous logic inversion units may comprises a given odd number of logic inverters.

In an embodiment of the present invention, the state-transition function associated with the at least one further logic circuit is an affine transformation, affine with respect to the binary field.

In particular, the generic element of the at least one logic circuit is selected from the group consisting of binary complement elements, binary identity elements and binary addition elements.

The sampling circuit may operate according to a timing signal, and may comprise a D-type flip-flop.

The at least one further logic circuit may comprise at least a first and a second further logic circuits, having respective output logic circuits operatively connected thereto and implementing the output function of the finite-state machine associated with the respective further logic circuit, the output logic circuits having each a respective output for providing an output signal by implementing said output function.

The raw random sequence source may further comprise a combination of the output signals of the output logic circuits for producing a combined output signal.

According to another aspect of the present invention, a method for generating random data comprises generating a raw random sequence and post-processing the raw random sequence so as to obtain said random data, wherein said post-processing the raw random binary sequence comprises continuously feeding the raw random binary sequence as an input to a synchronous state-transition sequential circuit.

Said feeding the raw random binary sequence may comprise:

feeding a current value of the raw random binary sequence to the state-transition sequential circuit of a finite-state machine by using a combination logic and clocking the state-transition logic circuit to produce a next internal state value, said next internal state value depending on the current raw random binary sequence value and on the internal state value at a current time.

The method may further comprise obtaining a combined output value by combining a value related to said current internal state value with said current value of the raw random binary sequence.

The method may further comprise obtaining said random data by taking the combined output values at irregular time intervals.

BRIEF DESCRIPTION OF THE DRAWINGS

The features and advantages of the present invention will be made apparent by the following detailed description of some preferred embodiments thereof, provided merely by way of non-limiting examples, description that will be conducted making reference to the attached drawings, wherein.

DETAILED DESCRIPTION OF THE PREFERRED INVENTION EMBODIMENTS

Figure 1:
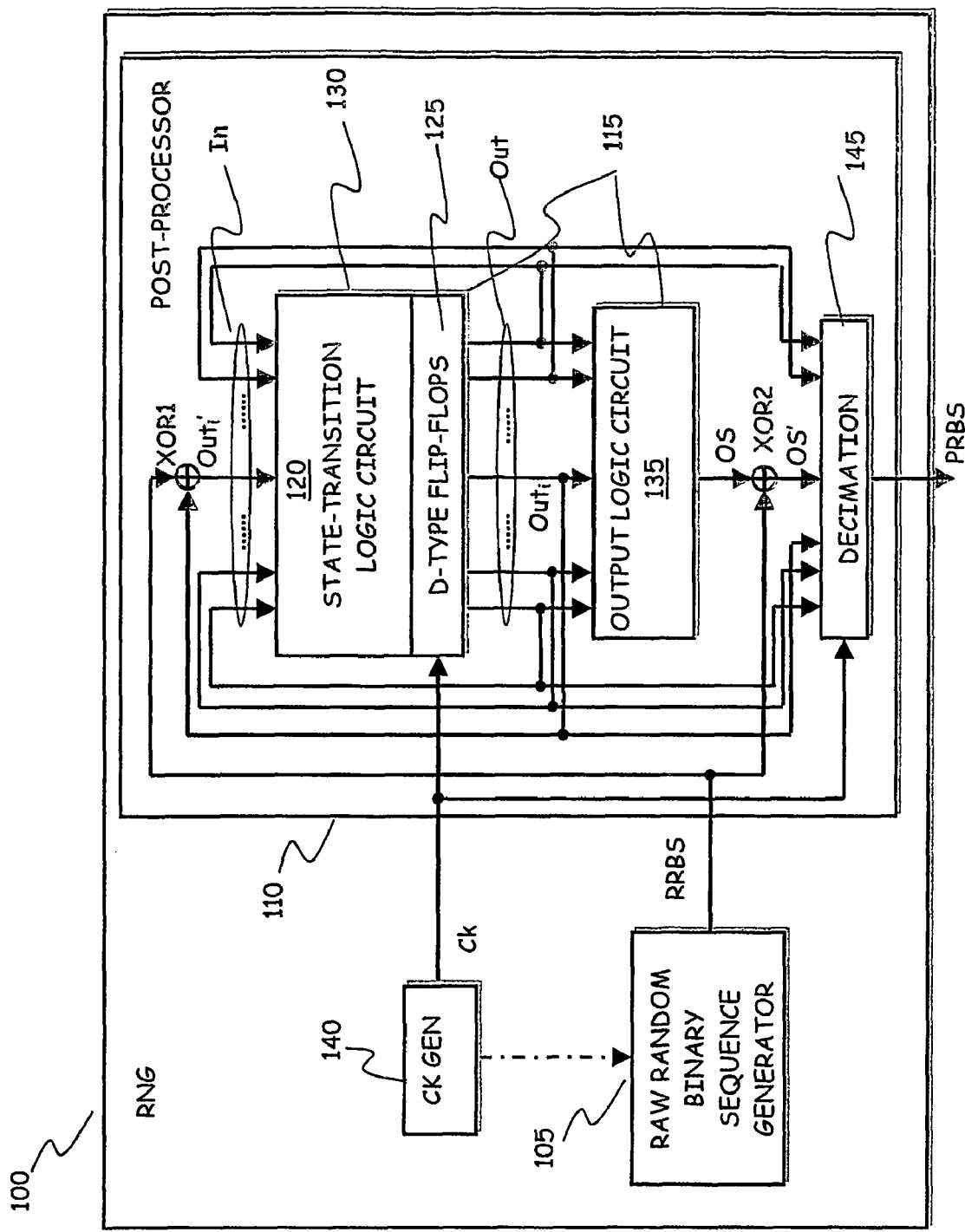
FIG. 1 schematically shows, in terms of the relevant functional blocks, the general structure of a RNG including a post-processing circuit according to an embodiment of the present invention.

Referring to the drawings, in FIG. 1 the general structure of an RNG according to an embodiment of the present invention is schematically shown, in terms of the relevant functional blocks. The RNG, globally identified by 100, includes a raw random sequence source 105, particularly a raw random binary sequence generator, generating a raw random binary sequence RRBS that is supplied to a post-processing circuit 110 for being post-processed so as to generate a purely random binary sequence PRBS.

According to an embodiment of the present invention, the post-processing circuit 110 includes a Pseudo-Random Number Generator (PRNG, implemented by means of a Finite-State Machine—FSM-) 115.

In an embodiment of the present invention, the FSM 115 includes a cascade of a logic (combinational) circuit 120 that implements a state-transition function, and is thus referred to as the state-transition logic circuit, and a plurality of delay units 125 connected in parallel, particularly D-type flip-flops. The cascade formed by the logic circuit 120 and the flip-flops 125 is called the state-transition sequential circuit 130. In particular, the FSM 115 is synchronous, and receives, as a timing signal, a clock signal Ck, generated by a clock signal generator 140. The clock signal Ck acts in particular as a trigger signal for the D-type flip-flops 125.

The state-transition sequential circuit 130 has inputs In adapted to receive input signals carrying input values to the state-transition sequential circuit 130 and outputs Out adapted to provide output signals carrying output values of the state-transition sequential circuit 130 (In the following, reference symbols In and Out will be indifferently used for indicating both the inputs and outputs as well as the input and output signals, respectively.) Particularly, the output signals Out correspond to the outputs of the D-type flip-flops 125. The values of the output signals Out vary according to the transition of states defined by the state-transition function, and such values, at a generic time, represent the current state of the FSM 115; due to feedback, these values are also used as the values of the input signals In to determine the next state of the FSM 115 at the outputs of the logic circuit 120. This next state is taken to the outputs of the state-transition sequential circuit 130 at the next time, that is, at the next edge of the clock signal Ck, to effectively become the next state of the FSM 115.

The FSM 115 further includes an output logic circuit 135 connected to the output signals Out of the state-transition sequential circuit 130 and suitable to apply an output logic function to said output signals so as to produce an output signal OS of the FSM 115.

According to an embodiment of the present invention, the raw random binary sequence RRBS generated by the raw random binary sequence generator 105 is continuously fed into the input to the FSM 115. In particular, according to an embodiment of the present invention, the output value of the state-transition sequential circuit 130 is continuously combined with the value of the raw random binary sequence RRBS, and the value resulting from such a combination is fed back to the state-transition logic circuit 120 as an input thereto. Even more in particular, according to an embodiment of the present invention, assuming by way of non-limitative example that the raw random binary sequence RRBS is represented by an one-bit signal (i.e., it is an one bit stream), the raw random binary sequence RRBS is combined, for example by an XOR operation (implemented for example by a two-input XOR gate XOR1) with at least one, denoted as $Out_i$ in the drawing, of the output signals Out of the state-transition sequential circuit 130, thus obtaining a combined signal $Out_i'$. The combined signal $Out_i'$ is fed back, together with the other output signals Out of the state-transition sequential circuit 130, to the inputs In thereof.

The input, raw random binary sequence RRBS is thus continuously introduced into the post-processing circuit 110, in the example through an XOR operation, which, at each time, combines a current input bit (i.e., one bit of the input raw random binary sequence RRBS) with at least one ($Out_i$) bit selected from the bits representing the current internal state of the FSM 115, and the result of the combination is fed back into the FSM 115 together with the other current internal state bits, so as to determine the value of the next internal state of the FSM 115, at the next time (i.e., at the next edge of the clock signal Ck).

It is observed that the adoption of an XOR operation (gate XOR1 in the drawing) for combining the input raw random binary sequence RRBS with at least one selected output $Out_i$ of the state-transition sequential circuit 130 is not to be considered limitative to the present invention: other types of combination are in fact possible. In particular, the input raw random binary sequence RRBS may be a multi-bit signal, and/or it might be combined with more than one of the outputs Out of the state-transition sequential circuit 130.

The output signal OS obtained from the output logic circuit 135 has a current value that is thus derived from the current internal state of the FSM 115 and is hence related to the previous values of the input raw random binary sequence RRBS, but the current value of the output signal OS is not related to the current value of the input raw random binary sequence RRBS. The current value of the output signal OS is further combined again with the current value of the raw random binary sequence RRBS; in particular, the combination is an XOR operation, implemented for example by a two-input XOR gate XOR2. As a result of the combination, a modified output signal OS' is obtained, whose value is related to the current internal state of the FSM 115 (and thus to the previous values of the input raw random binary sequence RRBS) and also to the current value of the input raw random binary sequence RRBS.

More generally, when the raw random binary sequence RRBS and the output signal OS of the output function include more than one bit at a time, the combination of the output signal OS with the input raw random binary sequence RRBS may be accomplished by an operation of the so-called "latin square" type (a class of operations to which the XOR operation belongs), which, as already known to those skilled in the art, is defined in a such a way that each operand can be recovered from the result of the operation given the value of the other operand.

Preferably, according to an embodiment of the present invention, the state-transition function implemented by the state-transition logic circuit 120 and the output function implemented by the output logic circuit 135 are chosen so as to satisfy the so-called "computational unpredictability" criterion: it is difficult, ideally computationally infeasible, to predict the sequence of values of the modified output signal OS' when the input raw random binary sequence RRBS is a fixed and known sequence, such as the "all-zeros" sequence, the "all-ones" sequence or, more generally, any predefined known sequence of "0"s and "1"s. In other words, the state-transition and output functions are such that, when the PRNG is operated in the autonomous mode (without being fed with an input raw random binary sequence) or is fed with an input binary sequence that is fixed and known, then it produces, as the modified output signal OS', an output sequence that is not easily predictable.

Preferably, according to an embodiment of the present invention, the at least one output signal $Out_i$, i.e., the corresponding internal state bit of the FSM 115 selected to be combined with the input raw random binary sequence RRBS, is chosen in such a way to satisfy the "propagation" criterion: for an arbitrarily chosen initial state of the FSM 115, a change of the first bit in the input raw random binary sequence RRBS gives rise to a pseudo-random (i.e., computationally unpredictable) change of the output bits in the output sequence OS' subsequent to the first output bit, that is, to a change difficult (ideally, computationally infeasible) to be predicted.

Moreover, the post-processing circuit 110 should satisfy the "randomness" criterion: the output sequence is purely random if the input sequence RRBS is assumed to be purely random. This condition is mathematically defined and can be controlled theoretically. In particular, a possible way to satisfy this criterion, as shown in FIG. 1, calls for combining the output signal OS of the output logic circuit 135 with the input RRBS sequence by means of an XOR operation (implemented in the shown example by the XOR gate XOR2). The randomness criterion is then satisfied due to the fact that the current value of the modified output signal OS' is obtained by XOR-ing the current value of the input sequence RRBS with the current value of the output signal OS, which itself depends on the previous values of the input sequence RRBS, but not on the said current value of the input sequence RRBS. More generally, when the raw random binary sequence RRBS and the output signal OS include more than one bit at a time, their combination may be performed by using a "latin square".

In order to eliminate or substantially reduce the statistical weaknesses exhibited by the raw random binary sequence RRBS, as discussed in the introductory part of the present description, the post-processing circuit 110 needs to carry out a reduction in speed, i.e., the output, purely random binary sequence PRBS should have a lower speed than the raw random binary sequence RRBS.

For this purpose, according to an embodiment of the present invention, the purely random binary sequence PRBS is obtained after applying the modified output signal OS' to a speed reduction circuit implemented as a decimation circuit 145, which takes to the output only some values of the modified output signal OS' while discarding the other values, depending on the internal state sequence of the FSM 115. In particular, the decimation circuit can be implemented by means of irregular clocking described below.

According to an embodiment of the present invention, the clock signal Ck that triggers the D-type flip-flops 125 of the FSM 115 may thus have a frequency that is the same as or even higher than the speed of the input sequence RRBS (expressed in bits per second). In particular, the clock signal Ck may be synchronous, or even coincide, with a timing (clock) signal used in the raw random binary sequence generator 105 to produce the raw random binary sequence RRBS. The reduction in speed needed for eliminating or substantially reducing the statistical weaknesses exhibited by the raw binary sequence RRBS is preferably achieved by means of an irregular clocking scheme: instead of taking the value of the modified output signal OS' at regular times (i.e., every period, or a fixed multiple of the period, of the clock signal Ck), the FSM 115 is each time clocked a variable number of times chosen from a set of at least two different numbers of times, i.e., it is clocked a number of times that is either a first number of times or a second number of times, before each new value of the modified output signal OS' is made available as a value of the output sequence PRBS. In other words, the decimation circuit 145 implements an irregular clocking scheme according to which each new value of the output sequence PRBS is made available after a time which is a variable multiple k of the period of the clock signal Ck that clocks the FSM 115, wherein said variable multiple k may take at least two different values. Such a decimation circuit is equivalent to a D-type flip-flop receiving at its input the output signal OS' and being clocked by an irregular clock signal, say Ck', having a time-varying period, which at each time is a multiple k of the period of the clock signal Ck.

In particular, according to an embodiment of the present invention, the irregular clocking scheme is a self-clock-controlled scheme, implemented according to a clock-control sequence that is obtained by applying a specified function (preferably chosen in such a way so as not to violate the above-mentioned "computational unpredictability" and "randomness" criteria) to the internal state sequence; in other words, the decimation circuit 145 implements an irregular clocking scheme such that, at current time, the next value of said variable multiple k depends on the current internal state of the FSM 115.

It is observed that a clock frequency higher than the speed of the input sequence RRBS means that each bit in the raw random binary sequence RRBS is actually repeatedly used at the input of the PRNG (i.e., it is presented twice or more at the input of the PRNG), whereas a lower clock frequency would mean that some of the bits in the raw random binary sequence RRBS are discarded. Instead, irregular clocking of the PRNG means that some of its output bits are discarded. Altogether, the output speed (i.e., the speed of the purely random binary sequence PRBS) can be higher than the input speed (the speed of the input raw random binary sequence RRBS) if the frequency of the clock signal Ck is sufficiently high.

In an embodiment of the present invention, if the clock-control sequence is a two-valued, binary sequence, i.e., if it includes only two different values, denoted as $\delta 1$ and $\delta 2$, then, each time an output bit is produced, the value of a clock-control bit (obtained by applying the specified function to the current FSM internal state) determines the number of times, $\delta 1$ or $\delta 2$, the D-type flip-flops should be clocked before the next output bit is produced. In this case, if the clock-control bit is not biased, then the expected reduction in speed due to the irregular clocking is $(\delta 1+\delta 2)/2$ times.

Figure 2:
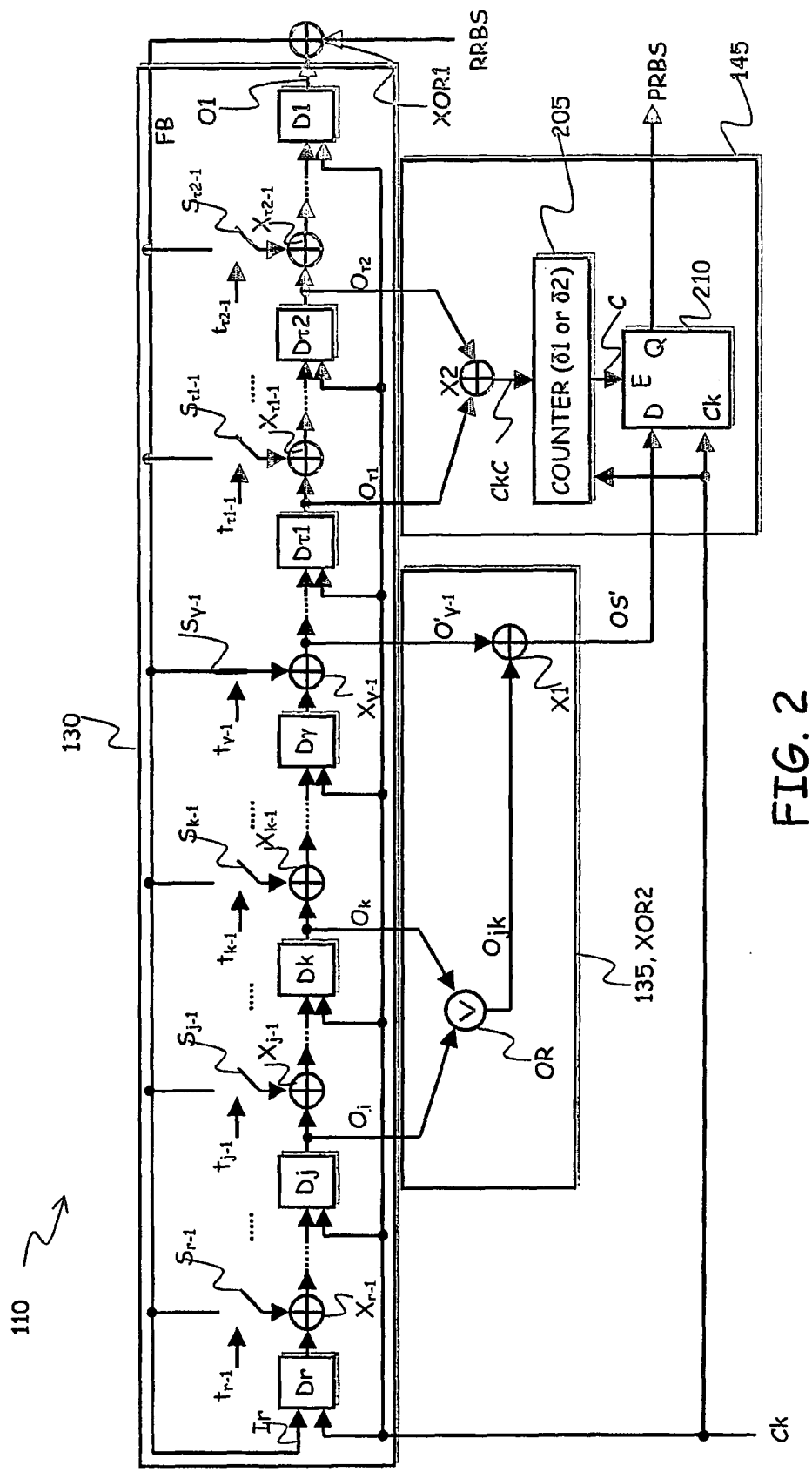
FIG. 2 shows, still schematically but in greater detail, a possible implementation of the post-processing circuit of FIG. 1, in an embodiment of the present invention.

FIG. 2 shows, still schematically but in greater detail, a possible implementation of the post-processing circuit of FIG. 1, in an embodiment of the present invention. In this invention embodiment, the PRNG comprises an LFSR, particularly a self-clock-controlled LFSR and, even more particularly, a self-clock-controlled LFSR in the so-called Galois configuration. Generally speaking, an LFSR is a cascade of a plurality of delay elements D1, ..., Dr (concisely, Di, with i=1 to r), where D1 is the last element and Dr the first element in the cascade (by convention, in the Galois configuration, the index identifying the generic delay element decreases from r to 1 in going from the first delay element to the last one in the cascade); the delay elements are typically formed by D-type flip-flops and are operated synchronously, being in particular clocked by a same clock signal, such as the clock signal Ck.

In a conventional Galois LFSR, the output O1 of the last flip-flop D1 forms a feedback signal, the signal FB depicted in FIG. 2, that is fed as an input Ir to the first flip-flop Dr. In the circuit of FIG. 2, the signal FB is also fed back to the input of at least another flip-flop in the cascade. In particular, feedback paths are provided that allow combining the feedback signal FB, preferably by means of two-input XOR gates $X_i$ (with i=1 to r–1, $X_{r-1}$ being the first XOR gate in the cascade), with the output signal of the generic flip-flop Di, so as to produce the input signal to the subsequent flip-flop in the cascade. In particular, which ones of the output signals of the flip-flops Di in the cascade are combined in XOR with the feedback signal FB to obtain the input signal to the subsequent flip-flop is determined by an open/closed state of a plurality of switches $S_i$ (with i=1 to r–1, $S_{r-1}$ being the first switch in the cascade); said open/closed state is specified by the assertion/deassertion of respective open/closed state control signals $t_i$ (with i=1 to r–1): when the generic control signal $t_i$ is deasserted, e.g., at a logic "0", the corresponding switch $S_i$ is open and the output signal of the preceding flip-flop D(i+1) in the cascade is not XOR-ed with the feedback signal FB, being instead directly fed as an input to the subsequent flip-flop Di in the cascade; on the contrary, when the control signal $t_i$ is asserted, e.g., at a logic "1", the corresponding switch $S_i$ is closed and the output signal of the preceding flip-flop D(i+1) in the cascade is XOR-ed with the feedback signal FB, and the resulting combination is fed as an input to the subsequent flip-flop Di in the cascade. In other words, the open/closed state of the generic switch $S_i$, as specified by the corresponding open/closed state control signal $t_i$, determines the effective number of feedback paths from the output of the last flip-flop D1 to the input of the other flip-flops (but the first) in the cascade.

It is observed that it is not necessary to materially implement (r−1) selectively activatable feedback paths, the activation of which is individually determined by the open/closed state of the respective switch: the open/closed state control signals $t_i$ may in fact be regarded as binary-valued coefficients, each coefficient specifying, depending on the respective value ("1" or "0"), if the associated feedback path is materially provided or not, that is, whether or not there is provided the two-input XOR gate $X_i$. However, if all the possible feedback paths are provided for, selectively activatable by controlling the respective switches, the circuit is configurable, and greater flexibility is ensured.

According to an embodiment of the present invention, the Galois-like LFSR is made to operate in a non-autonomous manner, i.e., it is fed with an input signal from the outside. In particular, in the exemplary invention embodiment of FIG. 2, the output O1 of the last flip-flop D1 is combined, in particular XOR-ed, by the XOR gate XOR1, with the input raw random binary sequence RRBS, so as to produce the feedback signal FB. Thus, according to this embodiment of the present invention, the feedback signal FB carries not only information on the current state of the LFSR, but also depends on the input raw random binary sequence. It is observed that the specific flip-flop output chosen to be combined with the input raw random binary sequence RRBS is not per-se limitative to the present invention.

The output signal OS of the LFSR is obtained by combining, particularly XOR-ing (by means of a two-input XOR gate X1), a first signal $O'_{\gamma-1}$ taken from the output of the XOR gate $X_{\gamma-1}$ that is connected to the output of the γ-th flip-flop Dγ, where $t_{\gamma-1}=1$, with a second signal $O_{jk}$ obtained as a combination of the further signals $O_j$ and $O_k$ taken from the outputs of two further flip-flops Dj and Dk in the cascade, respectively, particularly an OR combination performed by means of an OR gate OR. It is observed that nothing prevents from choosing, as the first signal, the output O1 of the last flip-flop D1 XOR-ed with the input signal RRBS (i.e., taking γ=1), in which case the LFSR output signal OS is formed by XOR-ing the feedback signal FB with the output of the OR gate OR.

Comparing the structure of FIG. 2 with that of FIG. 1, it is observed that the outputs of the flip-flops Dr, . . . , D1 in the cascade form the output signals Out of the state-transition sequential circuit 130. The output logic circuit 135 is comprised of the OR gate OR and two XOR gates $X_{\gamma-1}$ and XOR1, and the XOR gate XOR2 functionally corresponds to the XOR gate X1.

The Galois-like LFSR of FIG. 2, when clocked regularly (i.e., when the output bits are taken at regular intervals, corresponding in particular to the period of the clock signal Ck), is a linear sequential circuit governed by linear equations, and whose output (e.g., the output O1 of the last flip-flop D1) is relatively easily predictable by solving the corresponding linear equations.

According to an embodiment of the present invention, in order to eliminate the linear predictability of the LFSR, the decimation circuit 145 is provided, adapted to implement an irregular clocking; in other words, the decimation circuit 145 is such that not all the bits in the output sequence. OS' of the LFSR are taken in consideration: some of the bits in the LFSR output sequence OS' are instead discarded, but not regularly, rather according to an irregular clock-control scheme, particularly a self-clock-control scheme, determined by a clock-control signal.

In particular, according to an embodiment of the present invention, the decimation circuit 145 is adapted to implement the clock-control scheme in hardware, by means of a counting logic circuit, for example a multi-modulus (e.g., a two-modulus) counter 205, clocked by the clock signal Ck, and receiving a modulus selection signal CkC, that determines the modulus ($\delta1$ or $\delta2$) of the counter, in the example herein considered generated by combining, particularly XOR-ing in a XOR gate X2, the outputs $O_{\tau1}$ and $O_{\tau2}$ taken from the outputs of two flip-flops Dτ1 and Dτ2 in the cascade, respectively. More generally, the clock-control signal depends, according to a specified logic function, on the internal state of the LFSR, i.e., on the values of the outputs of the different flip-flops. Preferably, the flip-flops Dτ1 and Dτ2 are chosen so that min(i,j,γ)>max(τ1,τ2). The counter 205 has an output signal C that controls an enable input E of a D-type flip-flop 210, which receives at a data input D the output signal O of the LFSR, and is clocked by the clock signal Ck, so that the output is produced only when the enable input E is active. The operation of the decimation circuit is thus equivalent to that of a D-type flip-flop with an always active enable input, but irregularly clocked by another clock signal $Ck^9$ with a time-varying period, which at each time is a multiple of the period of the clock signal Ck, the multiple taking values $\delta1$ or $\delta2$ in this particular example. The output Q of the flip-flop 210 forms the output PRES of the post-processing circuit 110.

The clock-control signal CkC takes the form of a binary sequence, so that, each time an output bit is produced in the output sequence PRES, the values, at that time, of the two outputs $O_{\tau1}$ and $O_{\tau2}$ taken from the outputs of two flip-flops Dτ1 and Dτ2 in the cascade determine the value of the clock-control signal CkC, which in turn determines the number of times, $\delta1$ or $\delta2$ in the example herein considered, the LFSR should be clocked in order to produce the next output bit (by accordingly setting the two-modulus counter so as to count up to $\delta1$ or $\delta2$ before the signal C controlling the enable input E is asserted).

Since the clock-control signal CkC bit is not biased, the expected speed of the output sequence PRBS is $(\delta1+\delta2)/2$ times smaller than the frequency of the clock signal Ck.

The number r of flip-flops in the cascade, i.e., the length of the LFSR, and the feedback paths from the output of the last flip-flop in the cascade to the input of the other flip-flops, affect the period of the binary sequence, e.g., of the sequence appearing at the output O1 of the flip-flop D1 (however, any other flip-flop output may be considered), as well as the statistical properties thereof, when the input RRBS sequence is assumed to consist of all zeros. A convenient way to analyze the circuit of FIG. 2 is to represent the feedback coefficients by means of a binary "feedback" polynomial t(x):

$$t(x) = \sum_{i=0}^{r} t_i x^i$$

wherein $x^i$ corresponds to the generic flip-flop output, i varies from 0 to r, the summation is binary (i.e., it is a modulo-2 addition), and $t_0=t_r=1$. A condition ensuring that an LFSR is capable of generating binary sequences with maximal period (equal to $2^r-1$) and good statistical properties is that the feedback coefficients are chosen in such a way that the feedback polynomial is a primitive polynomial.

Merely by way of example, a practical implementation of the solution presented in FIG. 2 may provide for having an oscillator structure having the following binary polynomial t(x) (the number of flip-flops r=64):

$$t(x)=1+x+x^2+x^4+x^6+x^{11}+x^{13}+x^{14}+x^{16}+x^{23}+x^{24}+x^{27}+ x^{33}+x^{41}+x^{48}+x^{51}+x^{54}+x^{56}+x^{57}+x^{58}+x^{59}+x^{60}+x^{64}$$

with j=58, k=51, γ=42, τ1=30, τ2=17, $\delta1=3$, and $\delta2=5$.

Figure 3:
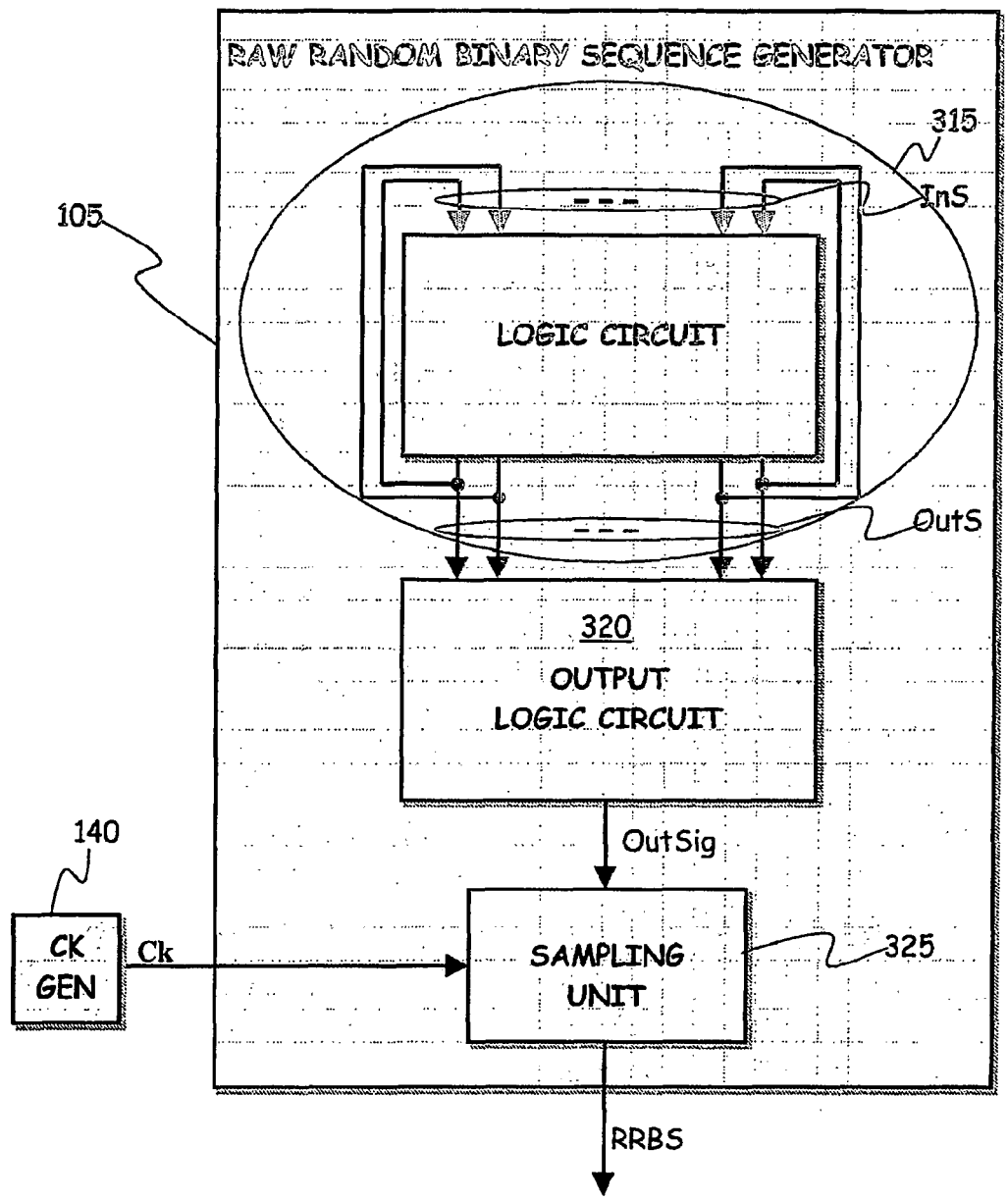
FIG. 3 schematically shows, in terms of the relevant functional blocks, the general structure of a raw random binary sequence generator according to an embodiment of the present invention.

In the following, a possible implementation of the raw random binary sequence generator 105 is described, making reference to FIGS. 3 to 5; however, it is pointed out that the specific structure of the raw random binary sequence generator is not limitative to the present invention, and the post-processing implemented by the post-processing circuit 110 can be applied to any raw random binary sequence RRBS, irrespective of the way it is generated in.

Referring now to FIG. 1, the general structure of the raw random binary sequence generator 105 according to an embodiment of the present invention is schematically shown, in terms of the relevant functional blocks. The raw random binary sequence generator 105 includes a logic (i.e., combinatorial) circuit with feedback 315, having a set of logic circuit inputs, for receiving input signals InS to the logic circuit, and a set of logic circuit outputs, for providing output signals OutS, which are fed back to the logic circuit inputs. The logic circuit with feedback 315 corresponds to an associated Finite-State Machine (FSM) having a state-transition function. In particular, the logic circuit with feedback 315 implements the state-transition function of an autonomous FSM, i.e., an FSM that receives no external inputs: all the inputs of the logic circuit 315 receive in feedback input signals, whose values represent the current state of the FSM, respective output signals of the logic circuit 315, whose values represent the next state of the FSM.

The logic circuit with feedback 315 is asynchronous, i.e., it is operated without a timing or clock signal, and it evolves through the succession of states in a manner that is not synchronous with a specific timing signal, but rather according to the delays of the constituent logic gates.

In particular, the state-transition function implemented by the logic circuit with feedback 315 is, in the mathematical sense, an affine transformation with respect to the binary field. As is generally known, an affine transformation or affine map between two vector spaces consists of a linear transformation followed by a translation. In the binary case, a linear transformation is composed of binary linear functions, where a binary linear function is a binary (XOR) sum of a subset of input variables, whereas an affine transformation is a linear transformation whose output variables are allowed to be complemented. Note that a binary complement of a binary variable is equal to the binary sum of this variable and the constant 1.

The logic circuit with feedback 315 is then composed of combinatorial logic elements; preferably, the generic combinatorial logic element of the logic circuit with feedback 315 is either a binary complement element (e.g., an inverter), or a binary identity element, or a binary addition element (e.g., an XOR logic gate).

In particular, to avoid feedback loops not involving any logic gate, the binary identity element is implemented by delay units, for example, composed of an even number of logic inverters.

The values of the logic circuit output signals OutS vary following the evolution of the logic circuit with feedback 315 through the corresponding sequence of states. The output signals OutS are fed to an output logic circuit 320, that implements an output logic function to be applied to the output signals OutS of the logic circuit with feedback 315, so as to produce an oscillating output signal OutSig. The logic circuit with feedback 315 and the output logic circuit 320 implement together an autonomous FSM operated asynchronously.

The oscillating output signal OutSig is fed to a sampling unit 325, operated by the timing or clock signal Ck generated for example by the clock signal generator 140 (although a different clock signal might be used); the sampling unit 325 is adapted to sample the oscillating output signal OutSig at a rate determined by the frequency of the clock signal Ck. The sampling unit 325 may for example comprise a D-type flip-flop, receiving at a data input thereof the oscillating output signal OutSig and being clocked by the clock signal Ck. In particular, the clock signal Ck may, for example, be the system clock of an Integrated Circuit (IC—not shown in the drawing) in which the RNG 100 is incorporated, for example, an IC for a smart card; alternatively, the clock signal Ck may be generated by means of an independent, free-running ring oscillator.

At the output of the sampling unit 325, the raw random binary sequence RRBS is obtained.

In particular, according to an embodiment of the present invention, the logic circuit with feedback 315 is such that no fixed points exist in its state-transition function. As known in the art, a state-transition function can be represented by a state-transition diagram, in which each state is connected by a directed branch to its corresponding next state, which is uniquely determined by the state-transition function. Adopting such a representation, the condition of the absence of fixed points in the state-transition function translates into the absence of loops in the state-transition diagram, wherein by loop there is intended a single state together with a single directed branch leaving from and re-entering into that state. If a fixed point exists in the state-transition function, the logic circuit with feedback 315 may, and in fact is likely to, get stuck in the corresponding state, in which case the output signals OutS would no more oscillate, having instead a constant value, thus producing a constant raw binary sequence. The condition of the absence of fixed points guarantees instead that the logic circuit with feedback 315 never gets stuck in a fixed state and thus oscillates among a number of states, so that the produced raw binary sequence does not have a constant value.

It is observed that the above-mentioned condition of the absence of fixed points in the state-transition function reflects on the internal structure of the logic circuit with feedback 315: for example, a logic circuit with feedback 315 having a structure similar to that of an LFSR, but operated asynchronously, with delay elements instead of synchronous D-type flip-flops, is not suitable, because the corresponding state-transition function has a fixed point, being a state composed of all zeros.

Also, still in order to avoid that the output signal OutSig remains constant, the output logic circuit 320 should be such that the output function it implements effectively depends on the parts of the internal state (i.e., on subsets of the output signals OutS) that do not get stuck at a fixed value, as the condition of the absence of fixed points does not imply that there are not parts of the internal state that can get stuck at a fixed value.

The described arrangement allows obtaining an output signal OutSig that is guaranteed to oscillate, and that not only exhibits digital pseudo-randomness properties similar to those of the output sequence of the same FSM when assumed to be operated synchronously, clocked by a clock signal, but, thanks to the asynchronicity, the output signal OutSig also exhibits randomness properties, due to unpredictable variations in the delay of logic gates in the logic circuit with feedback 315, delay variations being further propagated and enhanced through feedback, and, possibly, also to internal meta-stability events due to feedback as well. For example, delay variations may derive from fluctuations in operating voltage and temperature, because of various internal and external noise factors.

Advantageously, in addition to the pseudo-randomness and randomness properties of the output signal OutSig, additional randomness is introduced in the raw random binary sequence RRBS thanks to meta-stability that is induced within the sampling unit 325. For example, such meta-stability events are frequent if the following two conditions are met.

Firstly, the delay-to-rise time ratio of the oscillating output signal OutSig should be relatively small, which means that the delays of the internal logic gates of the logic circuit with feedback 315 are relatively short, which further means that the basic oscillating frequency of the output signal OutSig is relatively high. The basic oscillating frequency is reciprocal to the total logic delay in the shortest feedback loop present in the logic circuit with feedback 315. If such a condition is met, it is likely that many transitions in the oscillating output signal OutSig cannot be completed to the digital, binary level, so that this signal is likely to exhibit unpredictable variations on the analog as well as digital level; in other words, the oscillating output signal OutSig is not just a sequence of pure (full value) high and low voltage values corresponding to the digital values of 1 and 0, but rather it is more like a sort of analog noise.

Secondly, unlike the known solutions exploiting ring oscillators, the sampling rate of the oscillating output signal OutSig, corresponding to the frequency sampling clock signal Ck, instead of being much smaller than the basic oscillating frequency of the oscillating output signal OutSig to be sampled, is preferably similar to this frequency. Therefore, if the output signal OutSig has a relatively small delay-to-rise time ratio, then so does the clock signal Ck.

As a consequence of the two conditions defined above, the characteristic setup and/or hold times for the sampling D-type flip-flop are frequently violated. This in turn introduces additional randomness into the raw random binary sequence, due to frequent meta-stability events occurring in the sampling D-type flip-flop, maintaining the high speed of the oscillating output signal OutSig. As a result, a high-speed raw random binary sequence RRBS that contains a high amount of entropy per bit is thus obtained at the output of the sampling unit 325. In other words, the entropy rate (i.e., the amount of entropy per second) of the raw random binary sequence RRBS is high, as desired.

The degree of pseudo-randomness existing in the raw random binary sequence RRBS depends on the particular state-transition function of the FSM implemented by the logic circuit with feedback 315. In particular, for obtaining an oscillating output signal OutSig having a long period and good statistical properties, in synchronous operation, an additional requirement for the FSM is that the corresponding state-transition diagram contains only relatively long cycles. However, it is observed that also short cycles may be allowed, even cycles of length 2, composed of only 2 states, provided that such short cycles are meta-stable in the asynchronous operation, which means that it is practically impossible that the state sequence gets stuck in one of them by oscillating among the corresponding states. By way of comparison, a conventional ring oscillator, irrespective of the number of cascaded inverters, can always be equivalently reduced to a logic circuit with feedback containing only one logic inverter with an appropriate delay, so that the underlying state-transition diagram then has only one cycle of length 2, which is stable.

The good pseudo-randomness properties expected for the synchronous operation are translated into the corresponding pseudo-randomness properties corresponding to the asynchronous operation of the FSM, which, together with the introduced randomness properties described above, provide an increased degree of robustness, i.e., insensitivity to changes in the statistics of the underlying random variations in the delay of internal logic gates, in comparison with conventional ring oscillators.

Hereinafter, three possible practical implementations of the random binary sequence generator 105 will be presented, being intended that the three implementations that will be discussed are to be intended as merely exemplary, not at all limitative, and that other implementations are possible.

Figures 4, 5:
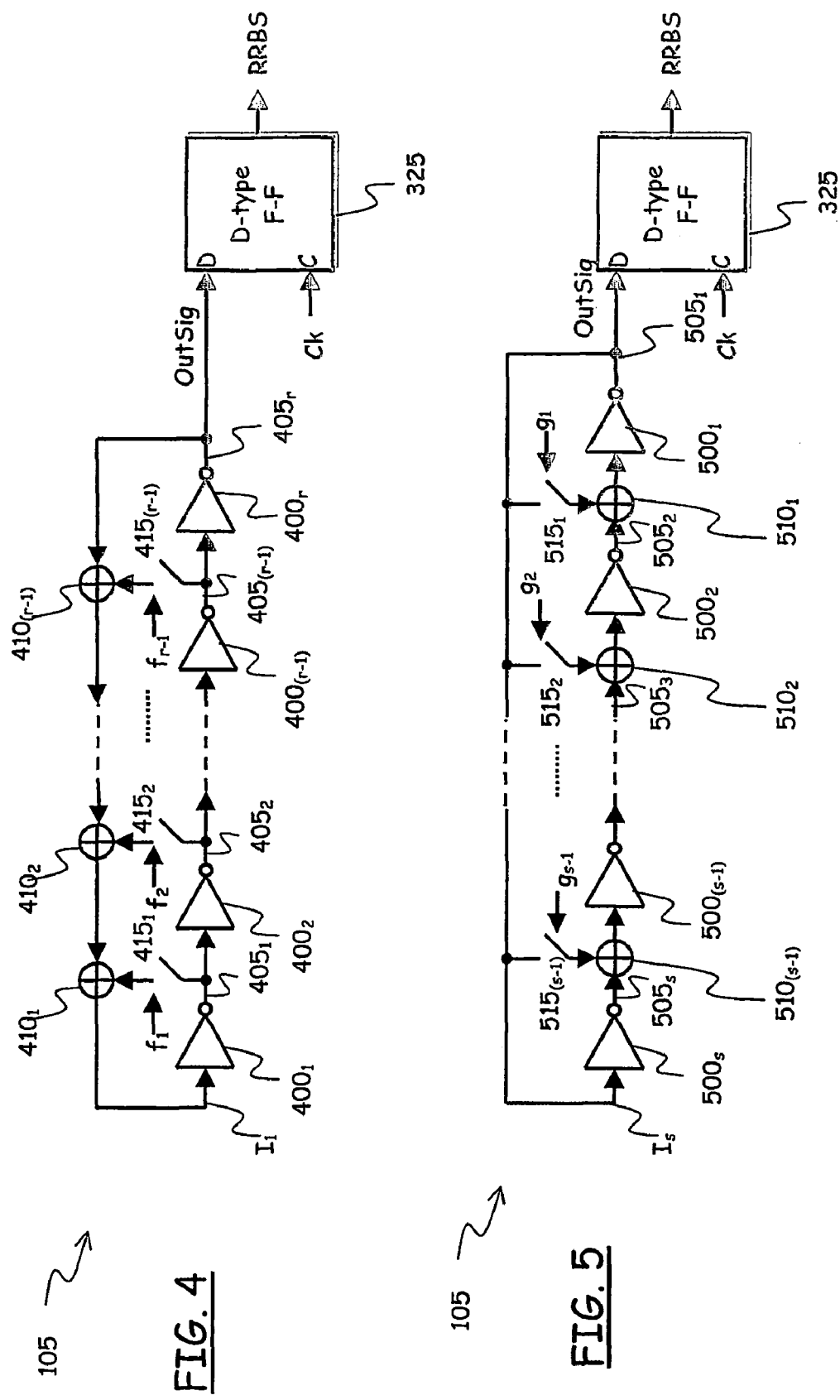
FIG. 4 shows a first possible implementation of the raw random binary sequence generator of FIG. 3.
FIG. 5 shows a second possible implementation of the raw random binary sequence generator of FIG. 3.

Referring firstly to FIG. 4, a plurality of, e.g., r, logic inversion units $400_1, 400_2, \ldots, 400_{(r-1)}, 400_r$ are connected in cascade one to another. Except for the last inversion unit $400_r$ in the cascade, the output of each inversion unit $400_1$, $400_2, \ldots, 400_{(r-1)}$ is directly used as the input to the next inversion unit.

A plurality of feedback paths from the outputs of the inversion units to the input of the first inversion unit $400_1$ in the cascade are provided. In particular, the output signal $405_r$ of the last inversion unit $400_r$ in the inversion units cascade, said output signal $405_r$ corresponding to the oscillating output signal OutSig of the raw random binary sequence generator 105, is fed back as an input signal $I_1$ to the first inversion unit $400_1$ of the inversion unit cascade; along the feedback path, said output signal $405_r$ is combined, particularly according to XOR operations (performed, for example, by two-input XOR gates $410_1, 410_2, 410_{(r-1)}$), with one or more of the output signals $405_1, 405_2, \ldots, 405_{(r-1)}$; which ones of the output signals $405_1, 405_2, \ldots, 405_{(r-1)}$ are combined in XOR operation with the output signal $405_r$ to obtain the input signal $I_1$ to the first inversion unit $400_1$ is determined by the open/closed state of one or more of a plurality of switches $415_1$, $415_2, \ldots, 415_{(r-1)}$; said open/closed state is specified by the assertion/deassertion of open/closed state control signals $f_1$, $f_2, \ldots, f_{r-1}$: when the generic control signal $f_i$ (i=1, 2, ..., r−1) is deasserted at a logic "0", the corresponding switch $415_i$ is open and the output signal $405_i$ is not XOR-ed with the output signal $405_r$ of the last inversion unit $400_r$; on the contrary, when the control signal $f_i$ is asserted at a logic "1", the corresponding switch $415_i$ is closed and the output signal $405_i$; is XOR-ed with the output signal $405_r$ of the last inversion unit $400_1$. In other words, the open/closed state of the switches $415_1, 415_2, \ldots, 415_{(r-1)}$, as specified by the logic state of the open/closed state control signals $f_1, f_2, \ldots, f_{r-1}$, determines the feedback paths from the outputs of the inversion units to the input of the first inversion unit of the cascade.

In a practical implementation, the generic inversion unit $400_i$ is, for example, formed by an elementary inverter, e.g., a CMOS inverter, or, alternatively, by an odd number of elementary inverters in a series; this latter construction may be in some circumstances preferable, because in this way the designer may individually adjust the transmission delay of the single inversion unit in the cascade. However, it is pointed out that the specific construction of the inversion units is not limitative to the present invention: in general, any logic circuit acting as a logic inverting delay unit can be exploited.

It is observed that, in practice, it is not necessary to materially implement (r−1) selectively activatable feedback paths, the activation of which is individually determined by the open/closed state of the respective switch: the open/closed state control signals $f_1, f_2, \ldots, f_{r-1}$ may in fact be regarded as binary-valued coefficients, each coefficient specifying, depending on the respective value, if the associated feedback path is materially provided or not. In other words, the output of the last inversion unit $400_r$, together with the outputs of the preceding inverters as specified by the coefficients $f_i$ being equal to "1" are XOR-ed together to form the feedback signal defining the input $I_1$ to the first inverter $400_i$ in the cascade; the outputs of those inversion units in the cascade corresponding to the coefficients $f_i$ equal to "0" are instead not used to form the feedback signal.

However, if all the possible feedback paths are provided for, selectively activatable by controlling the respective switches, the circuit results to be configurable, and greater flexibility is ensured.

It is also observed that although in the exemplary implementation herein described and shown the output signal OutSig coincides with the output signal of the last inversion unit $400_r$ in the cascade, this is not at all limitative: the output signal OutSig might in fact also be tapped off the output of any other inverter in the cascade.

The circuit of FIG. 4 resembles an LFSR in the so-called Fibonacci configuration (a so-called Fibonacci LFSR); however, differently from the Fibonacci LFSR, the circuit of FIG. 4 has asynchronous inverting delay units instead of synchronous delay units implemented as synchronously clocked D-type flips-flops. Importantly, the logic inversions operated by the inverting delay units make the circuit of FIG. 4 work in a mathematically different way from the Fibonacci LFSR, even if it is assumed to be operated synchronously.

The feedback paths from the outputs of the inversion units in the cascade to the input of the first inversion unit are preferably chosen in order to satisfy the above-mentioned requirement that no fixed points exist in the corresponding state-transition function.

For a mathematical analysis, it is convenient to represent the feedback coefficients by means of a binary polynomial f(x):

$$f(x) = \sum_{i=0}^{r} f_i x^i$$

wherein $x^i$ corresponds to the generic output $405_i$, with i=0 to r, the summation is binary (i.e., it is a modulo-2 addition, i.e., an XOR operation), and $f_0=f_r=1$.

Analysis of the state-transition function corresponding to the logic circuit with feedback shown in FIG. 4 is conducted by assuming that the circuit is operated in a synchronous manner, i.e., that the logic inversion units $400_1, 400_2, \ldots, 400_r$ operate on the basis of a timing signal, which (e.g. in simulations) can be implemented by introducing a synchronously clocked D-type flip-flop after each logic inversion unit in the cascade.

A mathematical analysis reveals that the circuit of FIG. 4 has no fixed points in the respective state-transition function if and only if the following conditions (in the following simply referred to as "condition $C_F$") are satisfied:

$f(x)=(1+x)h(x)$ and $h(1)=1$.

The above condition $C_F$ equivalently means that the polynomial f(x) is divisible by (1+x), i.e. that f(1)=0, and that the quotient polynomial h(x) is not divisible by (1+x). It is emphasized that from the above condition $C_F$ there follows that the degree r of the polynomial f(x) can be odd or even, but necessarily r≠2.

Further mathematical analysis shows that, provided that the above condition $C_F$ is satisfied, the state-transition diagram of the circuit of FIG. 4, assumed to be operated in a synchronous manner, contains one short cycle, particularly a cycle of length 2, composed of the two states of "all-zeros" and "all-ones", and a plurality of longer cycles, whose number and lengths depend on the polynomial h(x), in a way known in the theory of linear recurring sequences.

It thus follows that the said short cycle of length 2 is meta-stable in the asynchronous operation, because in practice the transition between these two states is extremely unlikely to happen, since when the outputs of all the inversion units quasi-simultaneously reach the intermediate voltage value, half-way between the voltage values corresponding to binary logic states of "1" and "0", the further transition in the same direction is not sustained any more and hence becomes unpredictable. As a consequence, if by chance the state sequence ever enters this cycle, then it can spend only a very short time in it.

Preferably, the polynomial h(x) is chosen in such a way so as to be a primitive polynomial (i.e., an irreducible polynomial with maximal period equal to $2^{r-1}-1$ as in this case, according to the theory of linear recurring sequences, there is only one long cycle, of length $2^r-2$. This ensures good pseudo-randomness properties of the oscillating output signal OutSig, including a long period and good statistical properties.

In addition to having good pseudo-randomness properties, the oscillating output signal OutSig also exhibits randomness properties, as discussed in connection with the more general structure of logic circuit with feedback 315 of FIG. 3, all the consideration made for that general structure being directly applicable to the specific logic circuit of FIG. 4. In particular, randomness properties derive from the unpredictable variations in the delay of the inverter logic gates, which get propagated and enhanced through feedback, the possible internal meta-stability events, and the frequent meta-stability events in the sampling D-type flip-flop.

For the logic circuit of FIG. 4, the frequency of the oscillating output signal OutSig is determined by the total delay of the logic inversion units in the shortest feedback loop, that is, in the loop identified by the smallest index i such that $f_i=1$. Thus, in order to obtain a high-speed oscillating output signal OutSig, it is preferable that such an index i is small, e.g., equal to 1 or 2 and that the delay introduced by the individual inverting units is small (in practice, this means that the (odd) number of elementary inverter logic gates forming the logic inversion units is relatively small).

For the logic circuit of FIG. 4, the internal meta-stability events, which as such may give rise to unpredictable state changes, are mainly characteristic of the internal states containing a constant string of length at least two that starts immediately after the point where the feedback signal is fed back into the cascade (that is to say, at the beginning of the cascade). This is because the state transition where the said constant string should be transformed into its binary complement may not be sustainable by the feedback signal. More precisely, similarly as for the meta-stability of the short cycle of length 2, this happens if the feedback signal has the same binary value and undergoes the same change as the said constant string.

The oscillating output signal OutSig can thus have a high speed and possess a significant amount of randomness not only at the digital level, but also at the analog level: the output signal OutSig, more than being a two-valued (voltage or current) purely digital signal, appears to be like a sort of analog noise. Altogether, a high-speed raw random binary sequence RRBS that contains a high amount of entropy per bit is thus obtained at the output of the sampling unit 325. Not only are the obtained randomness properties robust with respect to changes in the statistics of the random variations in the delay of the logic inversion units, but also, in the unlikely event of the total absence of these variations, the resulting raw random binary sequence will at worst possess good pseudo-randomness properties.

A second possible practical implementation of the random binary sequence generator 105 is shown in FIG. 5; similarly to the circuit of FIG. 4, a plurality of, e.g., s, logic inversion units $500_s, 500_{s-1}, \ldots, 500_2, 500_1$, are connected in cascade one to another. The output $505_1$ of the last inversion unit $500_1$ in the cascade is directly fed back and forms the input $I_s$ to the first inversion unit $500_s$ (for convenience, the indexes are now given in the reverse order when compared with the configuration depicted in FIG. 4).

In addition to the direct feedback from the output $505_1$ of the last inversion unit $500_1$ to the input $I_S$ of the first inversion unit $500_s$ a plurality of feedback paths from the output $505_1$ of the last inversion unit $500_1$ to the inputs of the inversion units $500_{(s-1)}, \ldots, 500_2, 500_1$ subsequent (downstream) to the first one in the cascade are provided. In particular, the output signal $505_1$ of the last inversion unit $500_1$, in the shown example corresponding to the output signal OutSig of the raw binary sequence generator, is combined, according to XOR operations (performed for example by two-inputs XOR gates $510_{(s-1)}, \ldots, 510_2, 510_1$), with the output signal $505_s, \ldots, 505_3, 505_2$ of the generic inversion unit $500_s, \ldots, 500_3, 500_2$ so as to produce the input signal to the subsequent inversion unit $500_{s-1}), \ldots, 500_2, 500_1$, respectively. Similarly to the circuit of FIG. 4, which ones of the output signals $505_s, \ldots, 505_3, 505_2$ are combined in XOR with the output signal $505_1$ to obtain the input signal to the subsequent inversion unit is determined by the open/closed state of a plurality of switches $515_{(s-1)}, \ldots, 515_2, 515_1$; said open/closed state is specified by the assertion/deassertion of open/closed state control signals $g_{s-1}, \ldots, g_2, g_1$: when the generic control signal $g_i$ (i=1, 2, ..., (s−1)) is a logic "0", the corresponding switch $515_i$ is open and the output signal $505_{i+1}$ is not XOR-ed with the output signal $505_1$ of the last inversion unit $500_1$, being instead directly fed as an input to the subsequent inversion unit $500_i$; on the contrary, when the control signal $g_i$ is a logic "1", the corresponding switch $515_i$ is closed and the output signal $505_{i+1}$ is XOR-ed with the output signal $505_1$ of the last inversion unit $500_1$. In other words, the open/closed state of the switches $515_1, 515_2, \ldots, 515_{(s-1)}$, as specified by open/closed state control signals $g_2, \ldots, g_{s-1}$, determines the type and number of feedback paths from the output of the last inversion unit to the input of the internal inversion units (but the first) in the cascade.

Also in this case, the generic inversion unit $500_i$ may, for example, be formed by an elementary inverter, e.g., a CMOS inverter, or, alternatively, by an odd number of elementary inverters in a series; this latter construction may be in some circumstances preferable, because in this way the designer may individually adjust the transmission delay of the single inversion unit. As in the previously described invention embodiment, the specific construction of the inversion units is however not limitative to the present invention: in general, any circuit acting as an inverting delay unit can be exploited.

It is observed that, similarly to the embodiment of FIG. 4, it is not necessary to materially implement (s−1) selectively activatable feedback paths, the activation of which is individually determined by the open/closed state of the respective switch: the open/closed state control signals $g_1, g_2, g_{s-1}$ may in fact be regarded as binary-valued coefficients, each coefficient specifying, depending on the respective value, if the associated feedback path is materially provided or not. However, if all the possible feedback paths are provided for, selectively activatable by controlling the respective switches, the circuit results to be configurable, and greater flexibility is ensured.

Furthermore, it is observed that also in this case the output signal OutSig might in principle be tapped off the output of any other inversion unit in the cascade, not necessarily from the last one.

The circuit of FIG. 5 resembles an LFSR in the so-called Galois configuration (so-called Galois LFSR); however, differently from the Galois LFSR, the circuit of FIG. 5 has asynchronous inverting delay units instead of synchronous delay units implemented as synchronously clocked D-type flips-flops. Importantly, the logic inversions operated by the inverting delay units make the circuit of FIG. 5 work in a mathematically different way from the Galois LFSR, even if it is assumed to be operated synchronously.

The feedback paths from the output of the last inversion unit in the cascade to the input of the other inversion units are preferably chosen in order to satisfy the above-mentioned requirement that no fixed points exist in the corresponding state-transition function.

Adopting again the binary polynomial representation of the feedback coefficients in the circuit of FIG. 5, it is obtained:

$$g(x) = \sum_{i=0}^{s} g_i x^i$$

wherein $x^i$ corresponds to the generic output $505_i$, with i=0 to s, the summation is binary (i.e., it is a modulo-2 addition, i.e., an XOR operation), and $g_0=g_s=1$.

Analysis of the state-transition function corresponding to the logic circuit with feedback shown in FIG. 5 is conducted by assuming that the circuit is operated in a synchronous manner, that the logic inversion units $500_1, 500_2, \ldots, 500_s$ operate on the basis of a timing signal, which can be implemented (e.g., in simulations) by introducing a synchronously clocked D-type flip-flop after each logic inversion unit in the cascade.

A mathematical analysis reveals that the circuit of FIG. 5 has no fixed point in the respective state-transition function if and only if the following conditions (in the following simply referred to as "condition $C_G$") are satisfied:
g(1)=0
and
s is odd.

The above condition $C_G$ equivalently means that the polynomial g(x) is equal to g(x)=(1+x)k(x), for a binary polynomial k(x), and that the degree of the polynomial g(x) is odd.

Further mathematical analysis shows that, provided that the above condition $C_G$ is satisfied, the state-transition diagram of the circuit of FIG. 5, still assumed to be operated in a synchronous manner, contains exactly one short cycle of length 2 if and only if the further condition k(1)=1 is satisfied.

The number and the lengths of the longer cycles depend on the polynomial k(x), in a way known in the theory of linear recurring sequences. Preferably, the polynomial k(x) is chosen to be a primitive polynomial, in which case there is only one long cycle of length $2^s-2$. This ensures good pseudo randomness properties of the oscillating output signal OS, including a long period and good statistical properties.

By further mathematical analysis, it can be derived that the short cycle of length 2 is composed of the two states of the following form. Let the s inverters be grouped into 2n+1 groups, separated by the effective feedback connections, that is, by the 2n nonzero feedback coefficients (the number has to be even as g(1)=0), and let the inverter output bits define the state vector of the logic circuit with feedback 315. Then, the two states take the forms $c_{n+1}*\Lambda_n c_n*\Lambda_{n-1} \ldots \Lambda_2 c_2*\Lambda_1 c_1*$ and $\neg c_{n+1}*\Lambda_n \neg c_n*_{n-1} \ldots \Lambda_2 \neg c_2*\Lambda_1 \neg c_1*$, respectively, where $\Lambda_i$ is an alternating string, $c_i*$ is the constant string obtained by repeating a constant $c_i$ and $\neg c_i*$ is the constant string defined by the binary complement of $c_i$. All the strings are uniquely determined by the following rule: if $c_1=0$, then the last bit of $\Lambda_i$ equals $c_i$ and the first bit of $\Lambda_i$ equals the binary complement of $c_{i-1}$. It thus follows that the transition between these two states is meta-stable unless all the constant strings have the same odd length, for example, equal to one. This is because the transition between the constituent constant strings and their binary complements is generally meta-stable (for reasons similar to those already explained in the context of the Fibonacci configuration). In particular, to enhance the meta-stability, when the output signal OutSig is taken from the last inverter in the cascade, it is thus recommended that the length of the first constant string, $c_1*$, should be even, for example, equal to two (which is equivalent to $g_1=0$ and $g_2=1$).

Also for the logic circuit of FIG. 5, the frequency of the oscillating output signal OutSig is determined by the total delay of the logic inversion units in the shortest feedback loop, that is, in the loop identified by the smallest index i such that $g_i=1$. Thus, in order to obtain a high-speed output signal OutSig, it is preferable that such an index i is small, e.g., equal to 2 (provided that $g_1=0$, as suggested above) and that the delay introduced by the individual inverting units is small (in practice, this means that the (odd) number of elementary inverter logic gates forming the logic inversion units is relatively small). In the present embodiment, the inverter delay may be even smaller than in the case of the circuit of FIG. 4, because in that case the feedback signal is produced with a delay, due to a series of XOR gates connected together, which is not present in the circuit of FIG. 5.

As for the logic circuit of FIG. 4, in addition to having good pseudo-randomness properties, the oscillating output signal OutSig, also exhibits randomness properties, for the reasons discussed in connection with the general logic circuit with feedback 315 of FIG. 3, which are all directly applicable to the specific logic circuit of FIG. 5 as well. The arguments include the unpredictable variations in the delay of the inverter logic gates, which get propagated and enhanced through feedback, possible internal meta-stability events, and frequent meta-stability events in the sampling D-type flip-flop. Due to different feedback configurations, the induced randomness properties of the logic circuits shown in FIGS. 4 and 5 may be somewhat different, but the main arguments remain the same.

For the logic circuit of FIG. 5, the internal meta-stability events, which as such may give rise to unpredictable state changes, are mainly characteristic of the internal states containing one or more constant strings of length at least 2 that start immediately after the points where the feedback signal is fed back into the cascade so that each such string and the value of the feedback signal are the same and undergo the same change as in the described meta-stable cycle of length 2. This is because the corresponding state transition where the said constant strings should be transformed into their binary complements is then not sustainable by the feedback signal. In this regard, the circuit of FIG. 5 is preferable to that of FIG. 4, because it contains more than just one such point and hence contains a larger number of states prone to meta-stability.

It is again emphasized that while in the circuit configuration of FIG. 5 an odd number of logic inversion units is required, in the circuit configuration of FIG. 4 the number of logic inversion units can be either odd or even.

Figure 6:
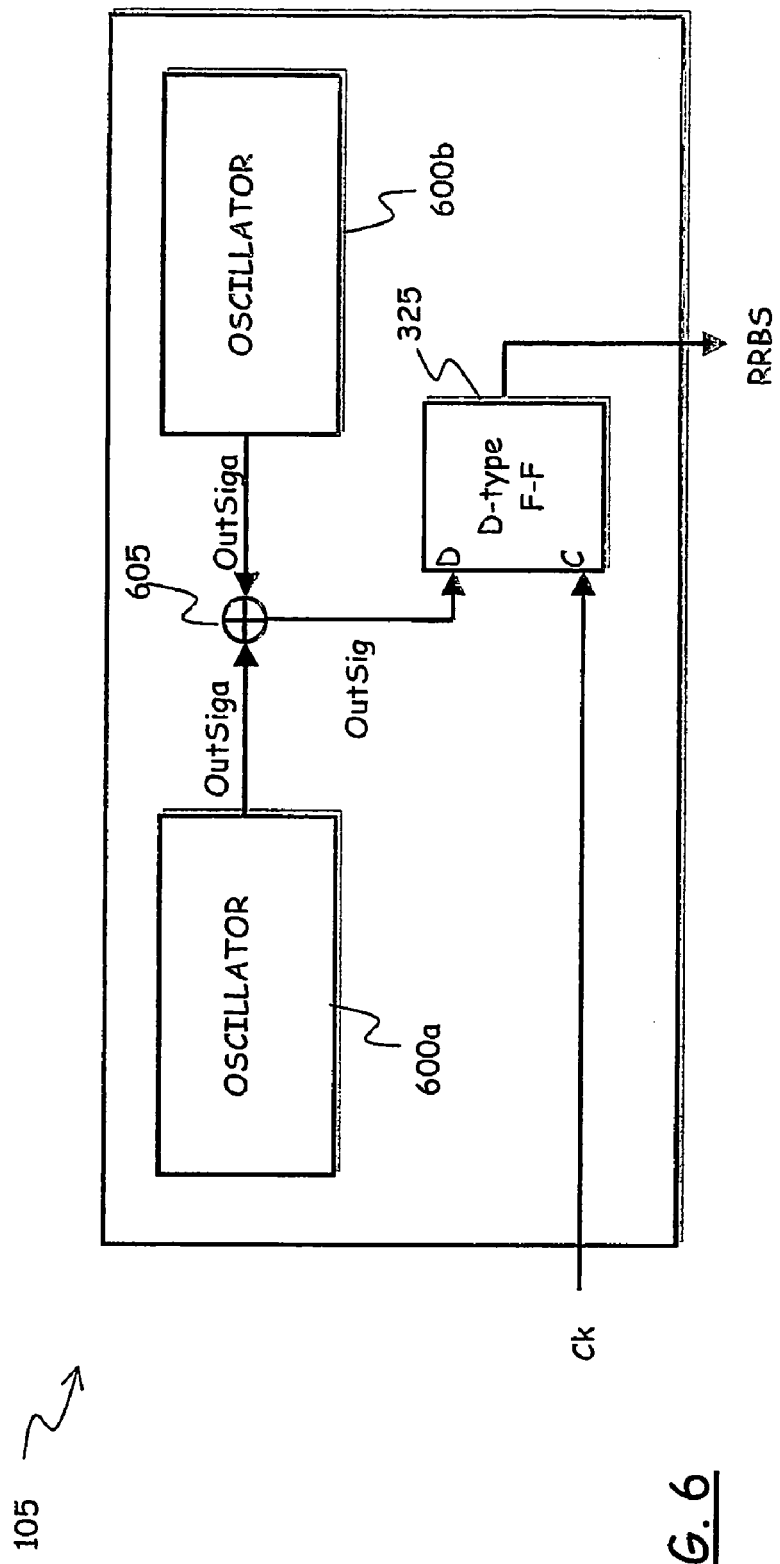
FIG. 6 shows a third possible implementation of the raw random binary sequence generator of FIG. 3.

A further possible implementation of the random binary sequence generator 105 is depicted schematically in FIG. 6. A first and a second oscillators 600a and 600b are exploited, one, e.g., the first oscillator 600a, being of the type shown in FIG. 4 without the sampling unit, the other, e.g., the second oscillator 600b, being of the type shown in FIG. 5 without the sampling unit. An output sequence OutSiga of the first oscillator 600a and an output sequence OutSigb of the second oscillator 600b are combined together, for example, they are bitwise XOR-ed by a two-input XOR gate 605. The resulting output sequence OutSig is fed to the sampling unit 325, operated by a clock signal Ck, producing the raw binary sequence RRBS.

Assuming that the first and second oscillators 600a and 600b are mutually independent, the structure of FIG. 6 further enhances the randomness properties and increases their robustness with respect to changes in the statistics of the random variations in the delay of the logic inversion units. For example, in the unlikely event of the total absence of these variations in one of the oscillators (for example, due to the technological reasons), the resulting raw random binary sequence will at worst possess randomness properties resulting from the other oscillator.

Preferably, the lengths of the two oscillators 600a and 600b, in terms of the numbers of constituent logic inversion units minus one, should be mutually prime, because in this way the period of the corresponding pseudorandom sequence is maximized and the interlocking or coupling effect is minimized. In particular, the lengths can differ only by one, where the even length corresponds to the oscillator 600a.

Merely by way of example, in a practical implementation of the solution presented in FIG. 4, the binary polynomial f(x) may be:

$$f(x)=1+x^2+x^4+x^5+x^{12}+x^{13}+x^{15}+x^{16}x^{18}+x^{20}$$

with the generic logic inversion unit $400_1, 400_2, \ldots, 400_r$, being composed of five elementary inverters. The corresponding long cycle then has length $2^{20}-2$. For the solution proposed in FIG. 5, the binary polynomial may be:

$$g(x)=1+x^2+x^3+x^7+x^{16}+x^{17}+x^{19}+x^{21}$$

with the generic logic inversion units $500_1, 500_2, \ldots, 500_s$, being composed of three elementary inverters. The corresponding long cycle then has length $2^{21}-2$. The long cycle for the XOR combination of the two oscillators then has length $2(2^{19}-1)(2^{20}-1)$. The ring oscillator forming the clock generator 130 that generates the sampling clock Ck is composed of eleven elementary inverters.

It is observed that other combinations of the oscillator structures of FIGS. 4 and 5 are also possible; more generally, a raw binary sequence generator may be constructed combining one or more oscillator structures of the type shown in FIG. 4 and/or one or more oscillator structures of the type shown in FIG. 5.

So far, it has been assumed that the PRNG in the post-processing circuit 110 is implemented by means of a Galois LFSR. In an alternative embodiment of the present invention, the PRNG may comprise an LFSR in the so-called Fibonacci configuration (shortly, a Fibonacci LFSR). In brief; a Fibonacci LFSR comprises a cascade of D-type flip-flops, wherein the first flip-flop receives at its input a feedback signal that is formed by XOR-ing the outputs of at least one of the flip-flops in the cascade.

The security level of the PRNG 110 (where by security level there is meant the level of difficulty in predicting the PRNG output sequence PRBS) is predominantly determined by the length r of the LFSR. For post-processing applications of a raw random binary sequence produced by a physical source of randomness, the LFSR length is preferably in the range $64 \leq r \leq 128$. Also, the security is affected by the number of non-zero feedback coefficients, that is, by the weight of the feedback polynomial t(x), which is suggested to be relatively close to r/2. An additional condition that is preferably satisfied is that the weight of the polynomial multiples of the feedback polynomial t(x) of moderately large degree is not small (e.g., for a polynomial of degree 64, the weight of its polynomial multiples of degrees smaller than 1000 is not smaller than 7); this avoids so-called "correlation attacks", and also avoids distinguishing output sequence from a purely random sequence.

The security level can be further increased, by using more than one LFSR, either Galois or Fibonacci, possibly implementing the irregular clocking scheme described in the foregoing, and combining their respective outputs by a suitable Boolean function. In particular, different LSFRs might be clocked in either the self-clock-control, or in a mutual-clock-control manner, with the clock-control signal generated in one LSFR being used to establish the clock-control sequence for the other LFSR, and vice versa.

Thanks to the present invention, output binary sequences of good statistical properties, particularly purely random output sequences, can be generated starting from raw random binary sequences having statistical weaknesses; in particular, if the raw random binary sequence is a high-speed sequence, the obtained output sequence has a smaller, but sufficiently high speed as well. Alternatively, the obtained output sequence can have a higher speed than the raw random binary sequence, in which case the obtained output sequence is not purely random, but is computationally indistinguishable from a purely random sequence.

A random number generator according to an embodiment of the present invention can be rather easily implemented in the practice by using only logic gates in digital semiconductor technology, and is suitable for integration in both FPGA (Field Programmable Gate Array) and ASIC (Application Specific Integrated Circuit) technologies; in particular, standard digital library units can be directly exploited, and the result is practically independent of the fabrication technology.

The random number generator according to the present invention can be advantageously exploited in many applications, in particular, for providing random bits to be used in computer games, in cryptographic algorithms and protocols for secret keys, and for countermeasures against side-channel attacks on microelectronic devices implementing cryptographic algorithms such as the integrated chip cards.

Although the present invention has been disclosed and described by way of some embodiments, it is apparent to those skilled in the art that several modifications to the described embodiments, as well as other embodiments of the present invention are possible without departing from scope thereof as defined in the appended claims.

For example, an adaptive irregular clocking scheme may be adopted, whereby the speed ratio $(\delta 1 + \delta 2)/2$ is caused to be inversely proportional to an estimate of the entropy rate of the input raw random binary sequence RRBS; such an estimate may for example be computed on-line, using a statistic such as the bias of individual bits and/or the autocorrelation function on relatively short segments of the input raw random binary sequence RRBS.

The invention claimed is:

1. An apparatus for generating random data, comprising a raw random sequence source adapted to generate a raw random sequence and a digital post-processor adapted to process said raw random sequence to generate said random data, wherein said digital post-processor comprises:
   a synchronous finite-state machine having at least one input adapted to repeatedly receive a current value of said raw random sequence from the raw random sequence source and having at least one output to provide a current output value depending on previous values of said raw random sequence;
   a logic circuit suitable to receive said current output value from said synchronous finite-state machine and said current value of said raw random sequence from the raw random sequence source and to provide current output data as a function of said current output value from said synchronous finite-state machine and said current value of said raw random sequence; and
   a decimation circuit suitable to receive said current output data from said logic circuit and to generate said random data, said finite state machine being suitable to be clocked by a first clock signal, said decimation circuit operating according to a second clock signal that has a period that is k times the period of the first clock signal, k having a value variable in time, said value being calculated each time random data is generated, the random data being related to the sequence of said current output data and being obtained by taking at least some values of the sequence of said current output data.

2. The apparatus according to claim 1, wherein said value of k at a given time depends on the current state of the finite-state machine.

3. The apparatus according to claim 1, wherein said logic circuit comprises a latin-square type logic circuit.

4. The apparatus according to claim 3, wherein said latin-square type logic circuit comprises an XOR gate.

5. The apparatus according to claim 2, wherein said finite-state machine implements a state-transition function and comprises a state-transition sequential circuit having a set of inputs and a set of outputs, said set of outputs being suitable to provide current state values of said state-transition function, said set of inputs comprising said at least one input of said finite-state machine, said apparatus comprising a further logic circuit suitable to receive at least one of said current state values and said current value of said raw random sequence and to provide an input value for said state-transition sequential circuit.

6. The apparatus according to claim 1, wherein the finite-state machine is such that output binary sequence is purely random if input raw random sequence is purely random.

7. The apparatus according to claim 1, wherein the finite-state machine is such that output binary sequence is computationally unpredictable even if the raw random sequence is known.

8. The apparatus according to claim 1, wherein the finite-state machine is such that a change in a first input bit of input binary sequence induces a computationally unpredictable change in subsequent output binary sequence.

9. The apparatus according to claim 5, wherein said finite-state machine comprises a plurality of synchronous delay logic units connected in a cascade one to another and clocked by the first clock signal, the plurality of synchronous delay logic units comprising a first and a last synchronous delay logic units in the cascade, said set of outputs comprising an output of the last synchronous delay logic unit and said set of inputs comprising an input of the first synchronous delay logic unit, said finite-state machine comprising a first feedback path from the output of the last synchronous delay logic unit to the input of the first synchronous delay logic unit, said plurality of synchronous delay logic units further comprising at least one intermediate synchronous delay logic unit in the cascade.

10. The apparatus according to claim 9, wherein said finite-state machine comprises at least one second feedback path from said output of the last synchronous delay logic unit to an input of a respective synchronous delay logic unit in the cascade, said respective synchronous delay logic unit being chosen from the group of the at least one intermediate synchronous delay logic unit and the last synchronous delay logic unit in the cascade.

11. The apparatus according to claim 10, wherein the finite-state machine further comprises an XOR logic combination of said at least one second feedback path and an output of a preceding synchronous delay logic unit that precedes said respective synchronous delay logic unit where said at least one second feedback path terminates.

12. The apparatus according to claim 11, wherein said at least one second feedback path comprises a plurality of feedback paths.

13. The apparatus according to claim 12, wherein the finite-state machine has an output signal, said output signal being extracted from a first internal state signal of the finite-state machine according to an irregular clocking.

14. The apparatus according to claim 13, wherein the irregular clocking is controlled by a clocking control signal, said clocking control signal being a logic combination of at least a second and a third internal state signals of the finite-state machine.

15. The apparatus according to claim 14, wherein the output signal is a logic combination of the first internal state signal with at least a fourth and a fifth internal state values of the finite-state machine.

16. The apparatus according to claim 1, wherein said raw random sequence source comprises at least one logic circuit corresponding to an associated finite-state machine having a state-transition function comprising states arranged to form cycles of states, wherein:

the at least one logic circuit has a set of logic circuit inputs and a set of logic circuit outputs fed back to said logic circuit inputs;
the associated finite-state machine is autonomous and asynchronous;
the state-transition function is void of loops; and
any of said cycles of states has either a minimum length equal to three states in case a cycle is stable, or a minimum length of two states in case a cycle is meta-stable.

17. A method for generating random data, comprising generating a raw random binary sequence and post-processing the raw random binary sequence so as to obtain said random data, wherein said post-processing the raw random binary sequence comprises:

continuously feeding the raw random binary sequence as an input to a synchronous state-transition sequential circuit;
obtaining a sequence of combined output values by combining a sequence of values, received from the synchronous state-transition sequential circuit, related to current internal state values of the synchronous state-transition sequential circuit with current values of the raw random binary sequence, and
obtaining said random data by using a decimation circuit suitable to receive said sequence of combined output values, wherein said decimation circuit operates according to a clock signal having variable time intervals calculated each time random data is generated.

18. The method according to claim 17, wherein said feeding the raw random binary sequence comprises:

feeding a current value of the raw random binary sequence to a state-transition sequential circuit of a finite-state machine by using a combination logic; and
clocking a state-transition logic circuit to produce a next internal state value, said next internal state value depending on a current raw random binary sequence value and on an internal state value at a current time.

19. The method according to claim 18, further comprising obtaining a combined output value by combining a value related to a current internal state value with said current value of the raw random binary sequence.

* * * * *